United States Patent
Eck et al.

(10) Patent No.: US 6,236,948 B1
(45) Date of Patent: May 22, 2001

(54) PROCESS AND DEVICE FOR DETERMINING A MEASURED VALUE OF A TARGET MEASURED VARIABLE OF A MULTIPHASE FLOW

(75) Inventors: Markus Eck, Leonberg; Peter Geskes, Stuttgart; Horst-Michael Prasser, Dresden; Norbert Kossok, Berlin; Peter Schuetz, Dresden, all of (DE)

(73) Assignee: Deutsches Zentrum fuer Luft-und Raumfahrt e.V., Bonn (DE)

( * ) Notice: Subject to any disclaimer, the term of this patent is extended or adjusted under 35 U.S.C. 154(b) by 0 days.

(21) Appl. No.: 09/092,253

(22) Filed: Jun. 5, 1998

(30) Foreign Application Priority Data

Jun. 7, 1997 (DE) .............................. 197 24 167

(51) Int. Cl.[7] ..................................... G01F 1/00
(52) U.S. Cl. ........................................ 702/45; 73/861.04
(58) Field of Search ................. 702/45, 50, 12, 702/100, 114; 73/861.04, 861.01, 861.02

(56) References Cited

U.S. PATENT DOCUMENTS

| | | | |
|---|---|---|---|
| 4,397,190 | * | 8/1983 | Hulin ................................ 73/861.04 |
| 4,442,720 | * | 4/1984 | Apley et al. ...................... 73/863.31 |
| 5,051,922 | * | 9/1991 | Toral et al. .......................... 700/285 |
| 5,576,495 | * | 11/1996 | Vetterick .......................... 73/861.04 |
| 5,586,027 | * | 12/1996 | Carlson et al. ........................ 702/6 |

FOREIGN PATENT DOCUMENTS 2 221 042   1/1990  (GB) .

\* cited by examiner

Primary Examiner—Marc S. Hoff
Assistant Examiner—Edward Raymond
(74) Attorney, Agent, or Firm—Barry R. Lipsitz

(57) ABSTRACT

In order to develop a method for determining a measured value of a target measured variable of a multiphase flow, in particular, of a two-phase flow, wherein a value of a pressure of the multiphase flow is measured as a primary measured variable by means of a measuring device, with which a desired target measured variable of a multiphase flow, for example, the total mass flow can be determined in a simple manner from a primary measured variable, it is suggested in accordance with the invention that a time development of the primary measured variable be measured, the measured time development of the primary measured variable be compared with reference time developments of the primary measured variable, with which a respective reference value of the target measured variable is associated, and the measured value of the target measured variable be determined from the reference values of the target measured variable as a function of the result of the comparison of the measured development of the primary measured variable with the reference developments of the primary measured variable.

39 Claims, 4 Drawing Sheets

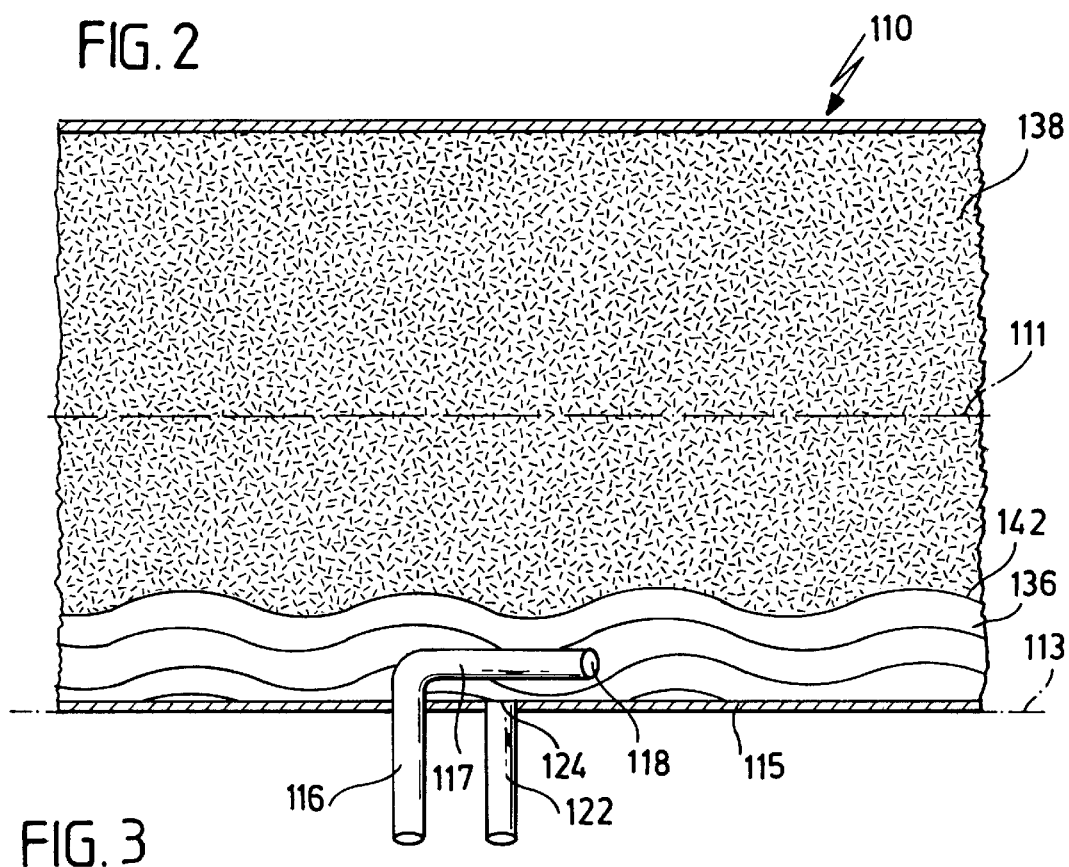
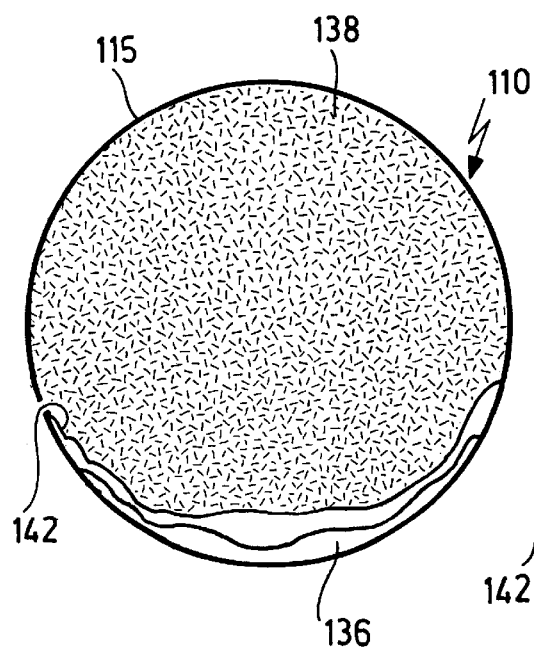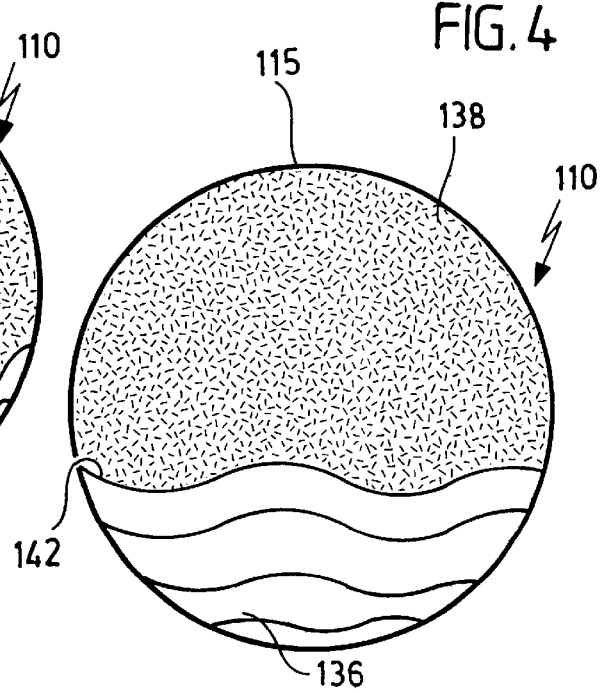

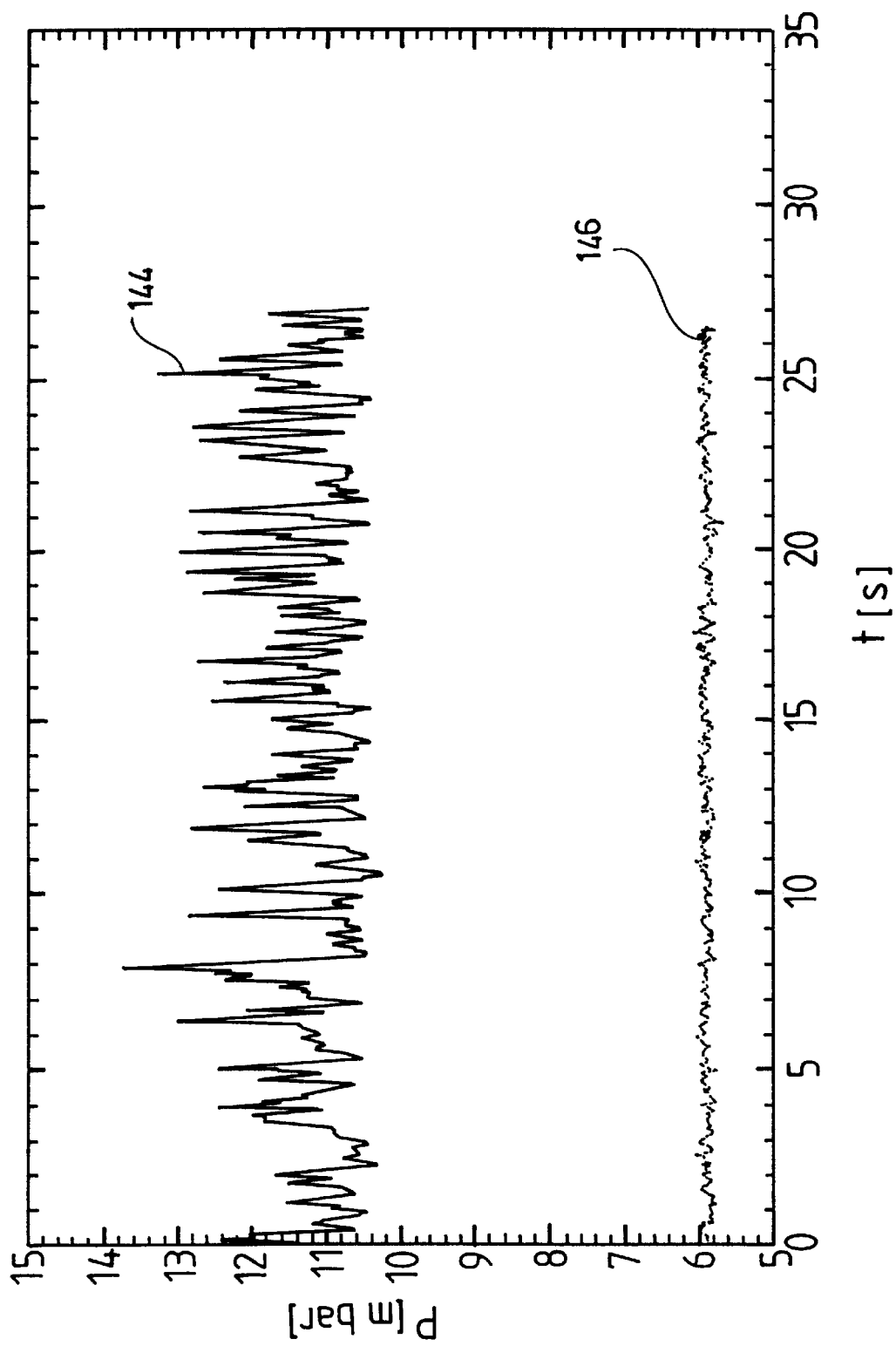

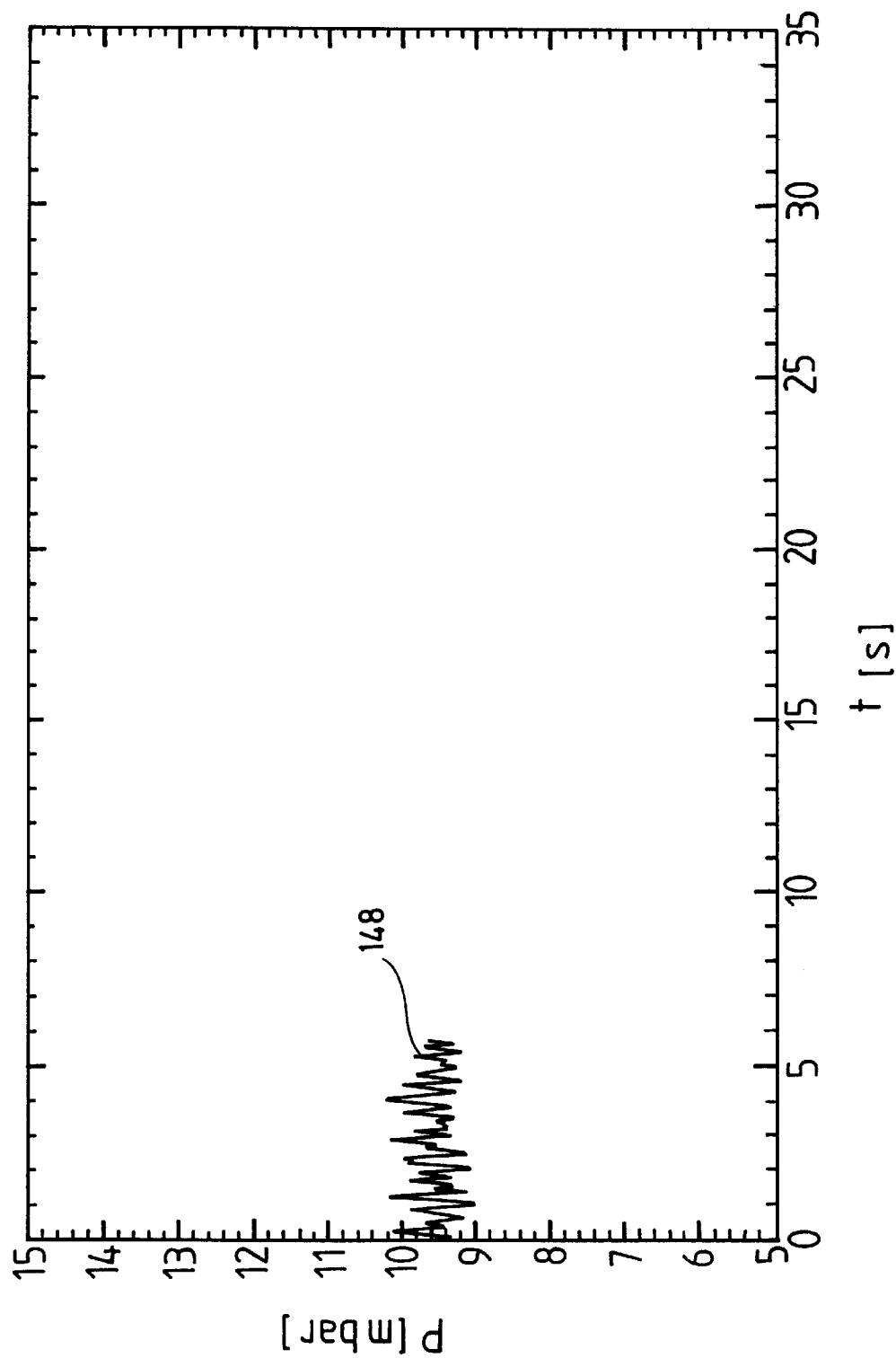

PROCESS AND DEVICE FOR DETERMINING A MEASURED VALUE OF A TARGET MEASURED VARIABLE OF A MULTIPHASE FLOW

The present invention relates to a process for determining a measured valued of a target measured variable of a multiphase flow, in particular, of a two-phase flow, with which a value of a pressure of the multiphase flow is measured as a primary measured variable by means of a measuring device.

Furthermore, the present invention relates to a device for determining a measured value of a target measured variable of a multiphase flow, in particular, of a two-phase flow, which comprises a measuring means for measuring a pressure of the multiphase flow as a primary measured variable.

A process of this type and a device of this type are known, for example, from the article "Verbesserte Speisewasserregelung durch kompaktes Meβsystem zur Massenstrom- und Dampfgehalts-bestimmung" (=Improved Feed-Water Regulation as a Result of a Compact Measuring System for the Determination of Mass Flow and Steam Content) by W. Kastner, C. Fischer and W. Krätzer, Erlangen, published in the journal BWK, Vol. 45 (1993), No. 12, pages 510 to 514. The cited publication discloses a measuring system for determining a measured value of the total mass flow and a measured value of the steam content of a water-steam flow in a steam generator which comprises a measuring means for measuring a differential pressure of the water-steam flow (a Venturi tube) and, in addition, a measuring means for measuring the mixture density of the water-steam flow (a gamma densitometer).

With this measuring system, the momentary proportion of steam mass is determined from the momentary value of the mixture density measured with the gamma densitometer and the momentary value of the total mass flow is determined from the momentary value of the differential pressure measured at the Venturi tube and the momentary value of the mixture density measured with the gamma densitometer.

In the case of the measuring device known from the cited publication and the measuring process carried out with it, it is a disadvantage that for determining a measured value of a desired target measured variable, namely the total mass flow, two primary measured variables, namely the differential pressure at the Venturi tube and the mixture density, have to be measured with two different, primary measuring means, namely a Venturi tube and a gamma densitometer. The necessity for two primary measuring means increases the space requirements of the measuring device, the required maintenance and the costs of the measuring device considerably.

Moreover, the gamma densitometer used in the known measuring system is a very expensive and complicated measuring means which, in addition, makes special safety precautions necessary on account of the use of radioactive material.

The object underlying the present invention is therefore to develop a process of the type specified at the outset, with which a desired target measured variable of a multiphase flow, for example, the total mass flow can be determined from one primary measured variable in a simple manner.

This object is accomplished in accordance with the invention, in a process of the type specified at the outset, in that a development with respect to time (time development) of the primary measured variable is measured, the measured time development of the primary measured variable is compared with reference time developments of the primary measured variable, each of which has a reference value of the target measured variable associated with it, and the measured value of the target measured variable is determined from the reference values of the target measured variable as a function of the result of the comparison of the measured development of the primary measured variable with the reference developments of the primary measured variable.

The inventive concept is based on the knowledge that each state of the multiphase flow can be characterized by the fluctuation pattern of a primary measured variable, i.e. on the basis of its development with respect to time. On the basis of the fluctuation pattern of the primary measured variable, different flow states of the multiphase flow can therefore be differentiated distinctly from one another while such a differentiation would not be possible on its own on the basis of the respective average value of the primary measured variable since a plurality of flow states which have this average value exist for each average value of the primary measured variable and so a clear association of an average value of the primary measured variable with a specific state of the multiphase flow is not possible.

On account of the comparison of the measured development of the primary measured variable with the reference developments of the primary measured variable previously determined, that reference state of the multiphase flow can be determined which best fits the actual flow state. The reference value of the target measured variable associated with this reference state is closest to the actual value of the target measured variable.

The inventive process has a high flexibility since, irrespective of the type of primary measured variable, optional target measured variables of the multiphase flow can be determined since the measurement of the primary measured variable is not used directly for calculating the measured value of the target measured variable but merely serves to identify the actual state of the multiphase flow.

Furthermore, it is of advantage that only one measuring means for measuring a single primary measured variable is required in order to carry out the inventive process.

The inventive process can be used, in particular, for monitoring flows in horizontal or inclined steam generators or in the case of oil and gas conveyance in horizontal or inclined pipe sections.

An additional advantage results from the fact that a pressure of the multiphase flow is measured as primary measured variable since pressure measuring means can be realized less expensively and require less maintenance and they are also temperature-resistant and pressure-resistant to a large extent.

The pressure of the multiphase flow measured as primary measured variable can be a static pressure, a pitot pressure or a dynamic pressure of the multiphase flow. Additional pressures or pressure differences of the multiphase flow can also be considered, for example, the differential pressure of the flow determined by means of a Venturi tube.

The use of a dynamic pressure of the multiphase flow as primary measured variable is particularly preferred since the flow velocity of a phase of the multiphase flow can be concluded directly from the dynamic pressure in this phase. It is, therefore, possible to check the correct functioning of the inventive process by selecting the flow velocity of the relevant phase as target measured variable or as one of a plurality of target measured variables and comparing the measured value of this target measured variable determined by means of the inventive process with the measured value determined from the average value of the dynamic pressure in the relevant phase.

A time development of the pressure selected as primary measured variable which characterizes a specific flow state of the multiphase flow particularly well is obtained when the pressure of the multiphase flow is measured at a point which is essentially constantly in contact with the same phase of the multiphase flow.

If the multiphase flow is a flow which comprises a gaseous and at least one liquid phase, the pressure selected as primary measured variable is preferably measured in the liquid phase.

In order to be able to measure the pressure essentially constantly in a phase of the multiphase flow which has a high, specific weight, it may be provided for the pressure of the multiphase flow to be measured in the lower third, preferably near to the lowest point, of a cross section of a horizontal or inclined pipe having the multiphase flow flowing through it.

In order, on the other hand, to be able to measure the pressure of the multiphase flow essentially constantly in a phase of the multiphase flow which has a low, specific weight, it may be provided for the pressure of the multiphase flow to be measured in the upper third, preferably near to the highest point, of a cross section of a horizontal or inclined pipe having the multiphase flow flowing through it.

The comparison of the measured development of the primary measured variable with the reference developments of the primary measured variable can be carried out in that a degree of similarity between the measured time development of the primary measured variable and one of the respective reference time developments of the primary measured variable is determined.

The measured value of the target measured variable can then be set equal to the reference value of the target measured variable which is associated with that reference time development which has the greatest degree of similarity to the measured time development of the primary measured variable.

Alternatively thereto, it may be provided, in particular, when only a few reference time developments of the primary measured variable and reference values of the target measured variable associated therewith are available, for the measured value of the target measured variable to be set equal to a weighted average of the reference values of the target measured variable, wherein the weight of each of the reference values is determined as a function of the degree of similarity between the measured time development of the primary measured variable and that reference time development, with which the reference value of the target measured variable is associated.

The degree of similarity between the measured time development and one of the respective reference time developments of the primary measured variable can be determined by means of a suitable pattern detection process.

The degree of similarity between the measured time development of the primary measured variable and one of the reference time developments can be determined, in particular, in that a measured value of a characteristic quantity is determined from the measured time development of the primary measured variable and a reference value of the characteristic quantity is determined from the reference time development and a distance between the measured value of the characteristic quantity and the reference value of the characteristic quantity is determined. The reciprocal value of the determined distance of the measured value of the characteristic quantity from the reference value of the characteristic quantity can serve as quantitative measure for the degree of similarity between the measured development and the respective reference development of the primary measured variable.

In simple cases, when only a few reference states of the multiphase flow are to be differentiated from one another, it may be sufficient to use as characteristic quantity a scalar quantity, for example, the variance of the values of the primary measured variable.

In a preferred development of the inventive process, a vectorial quantity having a plurality of components is, however, used as characteristic quantity in order to be able to characterize a plurality of possible reference developments of the primary measured variable and differentiate them from one another.

All those parameters which are suitable for describing the fluctuation pattern of the primary measured variable can be considered as components of a vectorial characteristic quantity. For example, it would be possible to use the frequency and/or amplitude of extreme values of the time development of the primary measured variable as components of the characteristic quantity.

It has, however, proven to be particularly favorable when the components of the characteristic quantity are parameters of a matching function which is matched to the measured time development and the reference time development, respectively, of the primary measured variable.

This matching function can be matched to the measured time development and the reference time development, respectively, of the primary measured variable by means of, for example, the least square method, which has the advantage that complete program packages are available for carrying out matching by means of this method on a computer for processing measuring signals.

No details have been given in the above concerning the formulation used for the matching function.

If a matching function is desired which is very flexible and allows a good matching to more or less any time developments of the primary measured variable, a matching function can be used, the function value of which at a point of time t represents a linear combination of the function values of the matching function at other points of time, wherein the coefficients of the function values of the matching function at the other points of time are the components of the characteristic quantity. Such a matching function is designated as a linear prediction model.

The number of the other points of time taken into account in the linear combination (and thus the number of the components of the characteristic quantity) is preferably selected such that the function value of the matching function at the point of time t represents a linear combination of the function values of the matching function at at least five, in particular, at least seven, preferably eleven other points of time. A linear prediction model of at least the fifth, in particular, at least the seventh, preferably the eleventh order is thus preferred. It is consequently ensured that the vectorial characteristic quantity has a sufficiently high dimension to be able to characterize each state of the multiphase flow distinctly even with complicated flow ratios.

In order to limit the necessary calculation requirements and keep the influence of statistical fluctuations on the determined value of the characteristic quantity as low as possible, the matching function should, however, be selected such that the function value of the matching function at the point of time t represents a linear combination of the function values of the matching function at at the most thirteen other points of time. A linear prediction model of at the most the thirteenth order is thus preferred. In this case, the characteristic quantity has at the most thirteen components.

Such a formulation, with which the other points of time and the point of time t follow one another equidistantly, is particularly suitable for the matching function.

No details have been given in the foregoing concerning the manner, in which the distance between the measured value of the characteristic quantity and the reference value of the characteristic quantity is determined.

A simple method for determining this distance consists in determining the distance between the measured value of the characteristic quantity and the reference value of the characteristic quantity via a measure of distance in accordance with the Euclidean metric.

Alternatively thereto, the distance between the measured value of the characteristic quantity and the reference value of the characteristic quantity can be determined via a measure of distance in accordance with the city block metric, the Chebyschev metric or the Canberra metric.

In this respect, particularly good results are achieved with the city block metric.

As already mentioned in the foregoing, optional target measured variables of the multiphase flow can be determined by means of the inventive process, irrespective of the type of primary measured variable used. Comprehensive information on the actual state of the multiphase flow can be obtained by determining measured values of a plurality of target measured variables in that reference values of a plurality of target measured variables are associated with each reference time development of the primary measured variable.

It can, in particular, be provided for one of the additional target measured variables determined to be a control measured variable, the measured value of which determined in accordance with the inventive process is compared with a measured value determined directly from the primary measured variable for the purposes of control.

Prior to a first measuring procedure reference time developments of the primary measured variable and the reference values of the target measured variable associated therewith must be provided first of all.

This may take place in a particularly simple manner by way of a so-called training procedure, with which a state of the multiphase flow is adjusted, the associated time development of the primary measured variable registered and the associated reference value of the target measured variable measured for each reference time development. Such a training procedure is possible in the case of optionally complex flow ratios of the multiphase flow, irrespective of how correctly these flow ratios may be described by way of theoretical models.

In simple cases it is, however, also conceivable for reference time developments of the primary measured variable and the reference values of the target measured variables associated therewith to be provided by means of theoretical calculations on the basis of flow models or by means of computer simulations of the multiphase flow.

The comparison of the measured time development of the primary measured variable with the reference developments of the primary measured variable can be carried out by means of a modern computer for processing measuring signals in fractions of a second so that the time required for determining a measured value of the target measured variable is essentially predetermined by the period of time, during which the time development of the primary measured variable has to be measured in order to obtain a sufficiently informative fluctuation pattern. This period of time is generally in the range of a few seconds.

Since the inventive process is thus suitable for the continuous topical determination of measured values of a target measured variable of the multiphase flow, this process can be utilized, in particular, to regulate a supply of fluid into a pipe having a multiphase flow flowing through it, in particular, into a steam generator pipe, as a function of a target measured variable of the multiphase flow.

In this respect, a mass flow, in particular, the total mass flow of the multiphase flow is advantageously used as target measured variable.

An additional object underlying the present invention is to provide a device for determining a measured value of a target measured variable of a multiphase flow, in particular, of a two-phase flow, of the type specified at the outset which allows a measured value of a desired target measured variable of the multiphase flow to be determined in a simple manner from the data recovered by way of a measuring means for measuring a primary measured variable.

This object is accomplished in accordance with the invention, in a device of the type specified at the outset, in that the device comprises a storage unit for storing a measured time development of the primary measured variable and reference values of the target measured variable respectively associated with a reference time development of the primary measured variable and a processing unit for comparing the measured time development of the primary measured variable with the reference time developments of the primary measured variable and for determining the measured value of the target measured variable from the reference values of the target measured variable as a function of the result of the comparison of the measured time development of the primary measured variable with the reference time developments of the primary measured variable.

The inventive device is suitable, in particular, for carrying out the inventive process described above and offers the advantages already described in conjunction with the inventive process.

The inventive device offers, in particular, the advantage that only one measuring means for measuring a single primary measured variable is required for determining measured values for optional target measured variables of the multiphase flow.

The processing unit of the inventive device can be designed as a circuit consisting of discrete electronic components and constructed especially for use in the inventive device or as a universally programmable computer for processing measuring signals with software programmed especially for use of the computer in the inventive device. In the latter case, the computer can also comprise the storage unit for storing a measured time development of the primary measured variable and reference values of the target measured variable respectively associated with a reference time development of the primary measured variable.

Advantageous developments of the inventive device are the subject matter of dependent claims 27 to 36, the advantages of which have already been explained in conjunction with the preferred developments of the inventive process.

The inventive device for determining a measured value of a target measured variable of a multiphase flow is particularly suitable for use in a device for regulating a supply of fluid into a pipe having a multiphase flow flowing through it, in particular, into a steam generator pipe as a function of a target measured variable of the multiphase flow.

Such a regulating device is the subject matter of claim 37.

Additional features and advantages of the invention are the subject matter of the following description and the drawings illustrating one embodiment.

In the drawings:

FIG. 2 shows a schematic longitudinal section through the steam generator pipe from FIG. 1;

FIG. 3 shows a schematic cross section through the steam generator pipe from FIG. 1, wherein a two-phase flow flowing through the steam generator pipe is in a state with a high steam content;

FIG. 4 shows a schematic cross section similar to that of FIG. 3, wherein the two-phase flow flowing through the steam generator pipe is in a state with a lower steam content than in FIG. 3;

Figure 1:
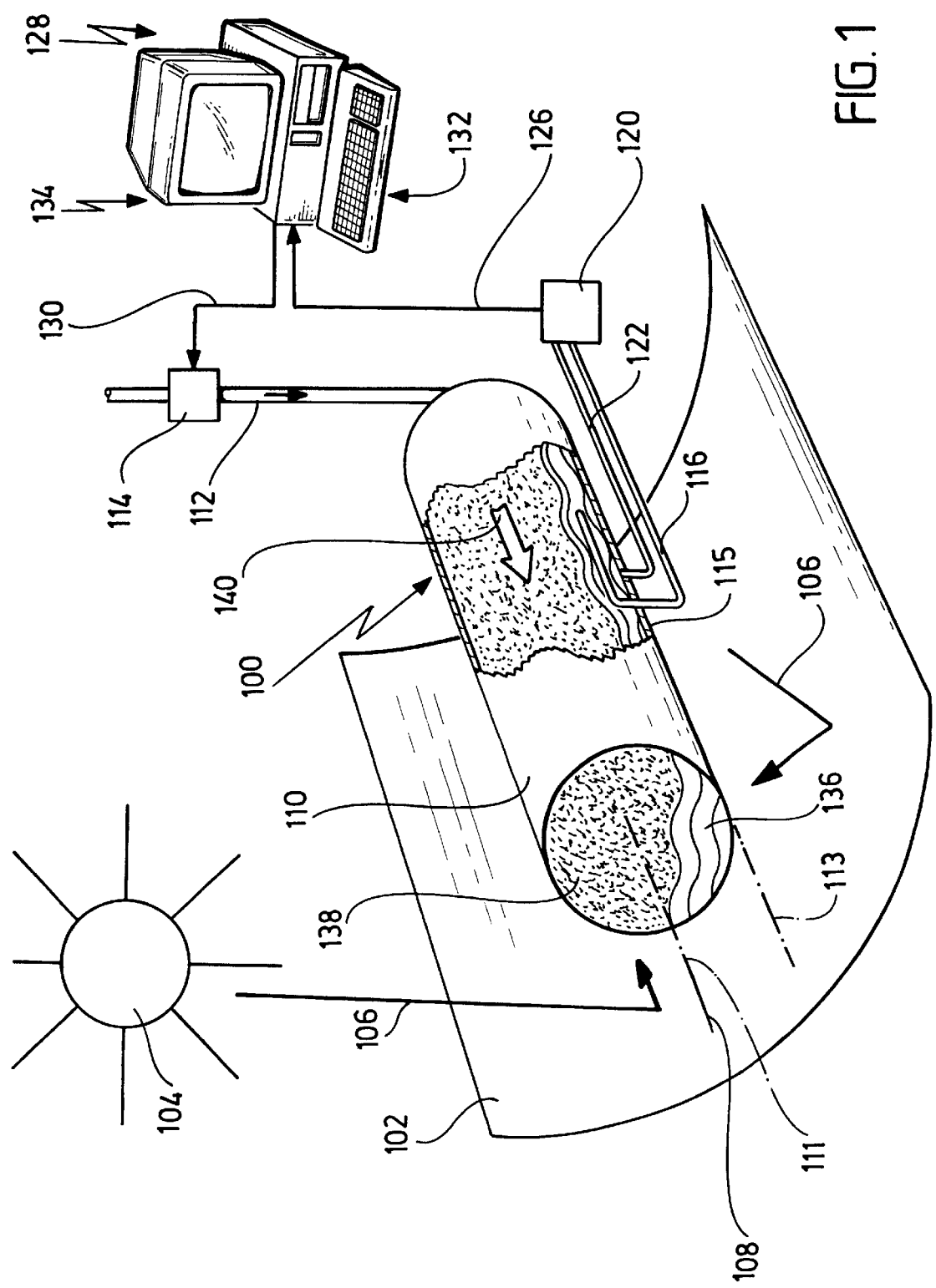
FIG. 1 shows a schematic, partially cutaway, perspective illustration of a solar-heated steam generator pipe with a device for regulating a supply of fluid into the steam generator pipe.

FIG. 5 shows a graph which contains a reference time development of the dynamic pressure measured in the liquid phase of the two-phase flow, associated with the state of the two-phase flow illustrated in FIG. 3, as well as a reference time development of the dynamic pressure measured in the liquid phase of the two-phase flow, associated with the state of the two-phase flow illustrated in FIG. 4; and FIG. 6 shows a graph which contains a measured time development of the dynamic pressure measured in the liquid phase of the two-phase flow.

The same or functionally equivalent elements are designated in all the Figures with the same reference numerals.

A solar-heated steam generator illustrated in FIG. 1 and designated as a whole as 100 comprises a mirror 102 which has a cross section constant in longitudinal direction and essentially parabolic and which focuses light rays 106 emitted by the sun 104 onto a line of focus 108 extending parallel to the longitudinal direction of the mirror 102.

A steam generator pipe 110 is arranged above the mirror 102 and its central axis 111 which is aligned essentially horizontal coincides with the line of focus 108 of the mirror 102.

The steam generator pipe 110 is closed at its rear end and connected to a fluid supply line 112 via a fluid supply opening. A controllable valve 114, for example, a solenoid valve is arranged in the fluid supply line 112 and this will be explained in detail later on.

At its front end (not illustrated) the steam generator pipe 110 is likewise closed and connected to a steam discharge line via a steam outlet opening. The steam generated in the steam generator pipe 110 can be supplied via the steam discharge line to a steam-operated plant, for example, a turbine or to a plant using steam, for example, a chemical reactor.

The casing wall 115 of the steam generator pipe 110 is penetrated at its lower apex line 113 by a first pressure transfer line 116, the region of which arranged within the steam generator pipe 110 is curved such that an opening 118, which is arranged at the end of this region and at which the first pressure transfer line 116 opens into the interior of the steam generator pipe 110, is aligned essentially at right angles to the central axis 111 of the steam generator pipe 110 (cf. FIG. 2).

At a further end arranged outside the steam generator pipe 110, the first pressure transfer line 116 is connected to an inlet of a differential pressure meter 120.

One end of a second pressure transfer line 122 is connected to a further inlet of the differential pressure meter 120 and this second line likewise penetrates the casing wall of the steam generator pipe 110 at its lower apex line 113 but already opens into the steam generator pipe 110 on the inner side of its casing wall so that an opening 124 of the second pressure transfer line 122, which is arranged at the end of the second pressure transfer line 122 facing away from the differential pressure meter 120, is aligned essentially parallel to the central axis 111 of the steam generator pipe 110.

The differential pressure meter 120 is connected via a measuring signal line 126 for electrical measuring signals to a signal input of a computer 128 for processing measuring signals which comprises a memory and a processing unit.

A control signal output of the computer 128 is connected via a control signal line 130 for electrical control signals to a control signal input of the controllable valve 114.

The first pressure transfer line 116, the second pressure transfer line 122, the differential pressure meter 120, the measuring signal line 126 and the computer 128 together form a device 132 for determining measured values of target measured variables of a two-phase flow through the steam generator pipe 110.

Together with the control signal line 130 and the controllable valve 114 in the fluid supply line 112 the device 132 forms a device 134 for regulating the supply of fluid into the steam generator pipe 110.

In the operational state of the steam generator 100, the fluid to be vaporized, for example, water is supplied to the rear end of the steam generator pipe 110 via the fluid supply line 112.

Heat is transferred to this fluid from the casing wall 115 of the steam generator pipe 110, which is heated due to absorption of the solar radiation reflected from the mirror 102 to its line of focus 108, so that this fluid is heated and finally vaporized.

The steam thereby forming flows essentially parallel to the central axis 111 of the steam generator pipe 110 towards the steam outlet opening (not illustrated) of the steam generator pipe 110. A portion of the pulse of the steam directed along the central axis 111 of the steam generator pipe 110 is thereby transferred to the fluid not yet vaporized so that this fluid also flows essentially parallel to the central axis 111 of the steam generator pipe 110 and a two-phase flow, comprising a liquid phase 136 and a gaseous phase 138, is formed through the steam generator pipe 110, the flow direction 140 of which is aligned parallel to the central axis 111 of the steam generator pipe 110 and specified in FIG. 1 by the arrow designated as 140.

As a function of the heat capacity supplied and the amount of fluid supplied, a plurality of different states of this two-phase flow through the steam generator pipe 110 can be formed, wherein specific values of the physical variables describing the two-phase flow are to be associated with each of these states.

Possible physical variables of the two-phase flow are, for example, the total mass flow through a cross section of the steam generator pipe 110, the fluid mass flow through a cross section of the steam generator pipe 110, the steam mass flow through a cross section of the steam generator pipe 110, the flow velocity of the liquid phase 136 relative to the steam generator pipe 110, the flow velocity of the gaseous phase 138 relative to the steam generator pipe 110, the proportion of steam mass in the total mass flowing through the steam generator pipe 110, the proportion of steam volume in the total interior volume of the steam generator pipe 110 or the like.

FIG. 3 illustrates an instantaneous photograph of a cross section of the steam generator pipe 110 with the two-phase flow flowing through it, wherein the two-phase flow is in a first state, in which the proportion of steam volume and the proportion of steam mass are high, the flow velocity of the gaseous phase 138 is comparatively high (approximately 7 m/s) and the total mass flow through a cross section of the steam generator pipe 110 is likewise comparatively high (approximately 75 g/s). The phase boundary surface 142 between the liquid phase 136 and the gaseous phase 138 has in this state a considerable waviness.

FIG. 4 illustrates a further cross section through the two-phase flow in the steam generator pipe 110, wherein the two-phase flow is in a second state, in which the proportions of steam mass and steam volume are less than in the first state illustrated in FIG. 3 and in which the flow velocity in the gaseous phase 138 (approximately 1 m/s) and the total mass flow through a cross section of the steam generator pipe 110 (approximately 20 g/s) are comparatively low. The waviness of the phase boundary surface 142 in the second state of the two-phase flow illustrated in FIG. 4 is likewise less than in the first state illustrated in FIG. 3.

On account of, inter alia, the very different waviness of the phase boundary surface 142 in the two states of the two-phase flow described in the foregoing, these states can also be differentiated distinctly on the basis of the time development of the pressures prevailing in the two-phase flow.

FIG. 5 illustrates a typical development of the dynamic pressure p in the liquid phase 136 of the two-phase flow as a function of a measuring time t for the first state illustrated in FIG. 3 (drawn in solid lines) and for the second state illustrated in FIG. 4 (illustrated in broken lines). The development with respect to time of the dynamic pressure in the first state is designated in the following as first reference development 144 and the development with respect to time of the dynamic pressure in the second state is designated in the following as second reference development 146.

As is apparent from FIG. 5, the first reference development 144 and the second reference development 146 are clearly different from one another with respect to the extent of the pressure fluctuations, the frequency and amplitude of pressure peaks, the distances with respect to time between consecutive pressure peaks as well as the variation in the distance with respect to time between consecutive pressure peaks and so on. On account of the fluctuation pattern of the dynamic pressure, the different flow states of the two-phase flow through the steam generator pipe 110 can be clearly differentiated from one another whereas such a differentiation would not be possible on the basis of the respective average value of the dynamic pressure alone since a plurality of flow states which have this average dynamic pressure exist for each average dynamic pressure and so a distinct association of an average dynamic pressure with a specific state of the two-phase flow is not possible.

The identifiability of the states of the two-phase flow on the basis of their pressure fluctuation pattern can be utilized with the devices 132 and 134, respectively, described in the foregoing for a process for determining measured values of target measured variables of the two-phase flow in the steam generator pipe 110 and a process for regulating the supply of fluid into the steam generator pipe 110 as follows:

Prior to the first measuring or regulating procedure, a sufficiently high number of reference developments of the dynamic pressure p, which serves as primary measured variable, in the liquid phase 136 as well as reference values of the desired target measured variable or the desired target measured variables, for example, the total mass flow and the proportion of steam mass, these reference values being respectively associated with the reference developments, must be provided.

This provision takes place by way of a so-called training procedure, as follows:

A desired flow state of the two-phase flow, which is intended to be "trained", is adjusted by way of a suitable variation of the parameters influencing the two-phase flow in the steam generator pipe 110, for example, the supply of fluid which can be varied by means of the controllable valve and the heating capacity which can be varied, for example, by pivoting the mirror 102 relative to the direction of incidence of the solar rays 106.

The end of the first pressure transfer line 116 arranged within the steam generator pipe 110 has the liquid phase 136 of the two-phase flow flowing into it essentially at right angles to its opening 118 so that the pitot pressure of the liquid phase 136 prevails in the first pressure transfer line 118.

The end of the second pressure transfer line 122 opening into the interior of the steam generator pipe 110 has the liquid phase 136 of the two-phase flow flowing into it essentially parallel to its opening 124 so that the static pressure of the liquid phase 136 prevails in the second pressure transfer line 122.

The differential pressure meter 120 generates an electrical signal which corresponds to the difference in the pressures which act on its inlets. Since, at least for more or less friction-free flows of more or less incompressible fluids, the difference between the pitot pressure and the static pressure of the fluid is its dynamic pressure, the signal generated by the differential pressure meter 120 corresponds to the dynamic pressure of the liquid phase 136 of the two-phase flow.

This electrical signal is conveyed via the measuring signal line 126 to the computer 128, scanned by this with a frequency of, for example, 1 kHz to 5 kHz for a measuring time of, for example, 27 seconds and stored in the form of discrete datapoints in a memory of the computer 128.

Furthermore, the reference values of the desired target measured variables, for example, the total mass flow and the proportion of steam mass, which are associated with the adjusted state of the two-phase flow, are determined with a conventional measuring method and allocated to the associated reference development of the dynamic pressure when stored in the memory of the computer 128.

Alternatively or supplementary hereto, the reference values of the target measured variables can be calculated from the parameters underlying the adjusted state of the two-phase flow, for example, the supply of fluid and the heating capacity on the basis of a theoretical model and stored in the memory of the computer 128.

The training step for the relevant reference-state of the two-phase flow is thus completed, and the training procedure is continued by adjusting an additional reference state until a sufficient number of reference states have been "trained".

If such a training procedure has already been carried out for a steam generator of identical construction, this training procedure need not be repeated. On the contrary, the reference developments already determined and the reference values of the target measured variables associated therewith can simply be imported.

Measured values of the desired target measured variables of the two-phase flow during normal operation of the steam generator are determined as follows:

In the manner described in the foregoing, the time development of the dynamic pressure in the liquid phase 136 of the two-phase flow is measured by means of the differential pressure meter 120 during a measuring period of, for example, 6 seconds and stored in the memory of the computer 128. Such a measured development 148 of the dynamic pressure p as a function of a measuring time t is illustrated in FIG. 6.

Subsequently, the measured time development 148 of the dynamic pressure is compared with the stored reference time developments of the dynamic pressure, for example, 144 and 146.

For the purpose of this comparison, a matching function in the form of $$p(t) = \sum_{n=1}^{k} a_n p(t - n\Delta t)$$

is matched to the measured time development of the dynamic pressure p, wherein t designates the measuring time, $\Delta t$ a constant time difference and the coefficients $a_n$ the components of a vector a of the dimension k which serves as characteristic quantity for the time development of the dynamic pressure.

The dimension k of the vector a is preferably selected at at least 5 and at the most 13; particularly good results may be achieved with k=11.

The components $a_n$ of the vector a represent the matching parameters and are determined, for example, in accordance with the least square method.

By matching the matching function specified above to the measured time development of the dynamic pressure, a measured value $a_M$ of the characteristic quantity with components $a_{M,n}$ is determined.

A reference value $a_R$ of the characteristic quantity with components $a_{R,n}$ is determined in a corresponding manner for each of the stored reference developments of the dynamic pressure by matching the matching function specified above to the respective reference development.

This determination of the reference values $a_R$ can already take place during the training procedure and need not be repeated for each measuring or regulating procedure.

In an additional step, the distance of the measured value $a_M$ of the characteristic quantity from the reference values $a_R$ of the characteristic quantity is determined. This distance d is determined as Euclidean distance in accordance with the formula $$d = \left[ \sum_{n=1}^{k} (a_{M,n} - a_{R,n})^2 \right]^{1/2}.$$

Alternatively thereto, the distance d can also be determined as a measure of distance in accordance with the city block metric in accordance with the formula $$d = \sum_{n=1}^{k} |a_{M,n} - a_{R,n}|.$$

The smaller the distance d between the measured value $a_M$ of the characteristic quantity and a reference value $a_R$ of the characteristic quantity, the greater the degree of similarity between the measured time development of the dynamic pressure and the reference development of the dynamic pressure, with which the relevant reference value $a_R$ of the characteristic quantity is associated.

It is therefore to be assumed that that reference state, which has the reference value of the characteristic quantity with the smallest distance from the measured value of the characteristic quantity, corresponds the most to the actual state of the two-phase flow. Consequently, the reference values of the target measured variables associated with this reference state also represent the best approximation to the actual values of these target measured variables. The required measured values of the desired target measured variables, for example, the total mass flow and the proportion of steam mass are therefore set equal to those reference values of these target measured variables which are associated with that reference time development which has the reference value $a_R$ of the characteristic quantity with the smallest distance d from the measured value $a_M$ of the characteristic quantity.

Since the measured time development 148 of the dynamic pressure illustrated in FIG. 6 is more similar to the first reference development 144 illustrated in FIG. 5 by solid lines than the second reference development 146 illustrated in FIG. 5 by broken lines, the measured value of the total mass flow would, for example, be set equal to the reference value of the total mass flow (75 g/s) associated with the first reference development 144.

It is to be noted that the limitation to only two reference developments 144, 146 in FIG. 5 merely serves the purpose of illustration. Normally, a considerably larger number of reference developments will be provided in order to achieve a greater definition of the measuring procedure.

Alternatively to the mode of procedure described in the foregoing, it is also possible to set the measured value of the required target measured variable equal to a weighted average of the reference values of the target measured variable, wherein the weight of each of the reference values of the target measured variable is to be determined as a function of the distance d between the measured value $a_M$ of the characteristic quantity and the reference value $a_R$ of the characteristic quantity of that reference development, with which the relevant reference value of the target measured variable is associated.

The weight, with which a reference value of the target measured variable is included in the weighted average, can be selected, in particular, reciprocally to the respective distance d.

The measured value of the target measured variable obtained in the manner described in the foregoing can be used for regulating the supply of fluid into the steam generator pipe 110.

If, for example, the total mass flow is used as target measured variable and the determined measured value of the total mass flow is above a predetermined nominal value, a control signal is sent to the controllable valve 114 from the computer 128 via the control signal line 130 and this signal causes the controllable valve 114 to close so that the supply of fluid into the steam generator pipe 110 is throttled and, subsequently, the total mass flow through the steam generator pipe 110 is reduced.

If, on the other hand, the measured value of the total mass flow obtained is below the predetermined nominal value, the computer 128 emits to the controllable valve 114 via the control signal line 130 a control signal which causes the controllable valve 114 to open so that the supply of fluid into the steam generator pipe 110 is increased and, subsequently, the total mass flow through the steam generator pipe 110 is increased.

The supply of fluid into the steam generator pipe 110 can be regulated in a corresponding manner when the proportion of steam mass of the two-phase flow is used as target measured variable. In this case, a drying out of the film of fluid in the steam generator pipe 110 can, in particular, be prevented in a simple manner in that when the measured value of the proportion of steam mass obtained is close to 100% a control signal is sent from the computer 128 to the controllable valve 114 which causes the controllable valve 114 to open and thus the supply of fluid into the steam generator pipe 110 to increase.

What is claimed is:

1. Process for determining a measured value of a target measured variable of a multiphase flow in a horizontal or inclined pipe, comprising:

measuring a value of a pressure of the multiphase flow at a point of a cross-section of the pipe having the flow through it, said point essentially constantly in contact with the same phase of the multiphase flow, as a primary measured variable by means of a measuring device;

measuring a time development of said primary measured variable;

comparing said measured time development of said primary measured variable with reference time developments of said primary measured variable, wherein a reference value of said target measured variable is associated with each reference time development; and determining the measured value of said target measured variable from the reference values of said target measured variable as a function of the result of the comparison of said measured development of said primary measured variable with said reference developments of said primary measured variable.

2. Process as defined in claim 1, wherein a static pressure of the multiphase flow is measured as the primary measured variable.

3. Process as defined in claim 1, wherein a pitot pressure of the multiphase flow is measured as the primary measured variable.

4. Process as defined in claim 1, wherein a dynamic pressure of the multiphase flow is measured as the primary measured variable.

5. Process as defined in claim 1, wherein the pressure of the multiphase flow is measured in the lower third, preferably near to the lowest point, of a cross section of a horizontal or inclined pipe having the multiphase flow flowing through it.

6. Process as defined in claim 5, wherein the pressure of the multiphase flow is measured in the upper third, preferably near to the highest point, of a cross section of a horizontal or inclined pipe having the multiphase flow flowing through it.

7. Process as defined in claim 1, wherein a degree of similarity between the measured time development of the primary measured variable and one of the respective reference time developments of the primary measured variable is determined.

8. Process as defined in claim 3, wherein the measured value of the target measured variable is set equal to the reference value of the target measured variable associated with that reference time development having the greatest degree of similarity to the measured time development of the primary measured variable.

9. Process as defined in claim 7, wherein the measured value of the target measured variable is set equal to a weighted average of the reference values of the target measured variable, wherein the weight of each of the reference values is determined as a function of the degree of similarity between the measured time development of the primary measured variable and that reference time development having the reference value of the target measured variable associated with it.

10. Process as defined in claim 7, wherein the degree of similarity between the measured time development of the primary measured variable and one of the reference time developments is determined by:

determining a measured value of a characteristic quantity from the measured time development of the primary measured variable;

determining a reference value of the characteristic quantity from the reference time development; and determining a distance between the measured value of the characteristic quantity and the reference value of the characteristic quantity.

11. Process as defined in claim 10, wherein a scalar quantity is used as the characteristic quantity.

12. Process as defined in claim 10, wherein a vectorial quantity having a plurality of components is used as the characteristic quantity.

13. Process as defined in claim 12, wherein the components of the characteristic quantity are parameters of a matching function matched to the measured time development and the reference time development, respectively, of the primary measured variable.

14. Process as defined in claim 13, wherein the matching function is matched to the measured time development and the reference time development, respectively, of the primary measured variable by means of the least square method.

15. Process as defined in claim 13, wherein a matching function is used with a function value at a point of time t representing a linear combination of the function values of the matching function at other points of time, wherein the coefficients of the function values of the matching function at the other points of time are the components of the characteristic quantity.

16. Process as defined in claim 15, wherein the function value of the matching function at the point of time t represents a linear combination of the function values of the matching function at at least 5 other points of time.

17. Process as defined in claim 15, wherein the function value of the matching function at the point of time t represents a linear combination of the function values of the matching function at at least 7 other points of time.

18. Process as defined in claim 15, wherein the function value of the matching function at the point of time t represents a linear combination of the function values of the matching function at 11 other points of time.

19. Process as defined in claim 15, wherein the function value of the matching function at the point of time t represents a linear combination of the function values of the matching function at the most 13 other points of time.

20. Process as defined in claim 15, wherein the other points of time and the point of time t follow one another equidistantly.

21. Process as defined in claim 10, wherein the distance between the measured value of the characteristic quantity and the reference value of the characteristic quantity is determined via a measure of distance in accordance with the Euclidean metric.

22. Process as defined in claim 10, wherein the distance between the measured value of the characteristic quantity and the reference value of the characteristic quantity is determined via a measure of distance in accordance with the city block metric.

23. Process as defined in claim 1, wherein measured values of a plurality of target measured variables are determined in that reference values of a plurality of target measured variables are associated with each reference time development of the primary measured variable.

24. Process as defined in claim 1, wherein the reference time developments of the primary measured variable and the reference values of the target measured variable associated therewith are provided in that a state of the multiphase flow is adjusted, the associated time development of the primary measured variable registered and the associated reference value of the target measured variable measured for each time development.

25. Process as defined in claim 1, wherein said multiphase flow is a two-phase flow.

26. Process for regulating a supply of fluid into a pipe having a multiphase flow flowing through it, in particular, into a horizontal or inclined steam generator pipe, as a function of a target measured variable of the multiphase flow, wherein a measured value of the target measured variable is determined in accordance with the process as defined in claim 1.

27. Process as defined in claim 26, wherein a mass flow, in particular, the total mass flow of the multiphase flow is used as target measured variable.

28. Device for determining a measured value of a target measured variable of a multiphase flow, comprising:
a means for measuring a pressure of the multiphase flow as a primary measured variable;
a storage unit for storing a measured time development of the primary measured variable and reference values of the target measured variable respectively associated with a reference time development of the primary measured variable; and
a processing unit for comparing the measured time development of the primary measured variable with the reference time developments of the primary measured variable and for determining the measured value of the target measured variable from the reference values of the target measured variable as a function of the result of the comparison of the measured time development of the primary measured variable with the reference time developments of the primary measured variable;
wherein said means for measuring a pressure is designed and arranged such that the pressure of the multiphase flow is measurable at a point of a cross section of a horizontal or inclined pipe, which has the multiphase flow flowing through it, said point essentially constantly in contact with the same phase of the multiphase flow.

29. Device as defined in claim 28, wherein the device comprises a means for measuring a static pressure of the multiphase flow.

30. Device as defined in claim 28, wherein the device comprises a means for measuring a pitot pressure of the multiphase flow.

31. Device as defined in claim 28, wherein the device comprises a means for measuring a dynamic pressure of the multiphase flow.

32. Device as defined in claim 28, wherein the means for measuring a pressure is arranged such that the pressure of the multiphase flow is measurable in the lower third, preferably near to the lowest point, of a cross section of a horizontal or inclined pipe having the multiphase flow flowing through it.

33. Device as defined in claim 28, wherein the means for measuring a pressure is arranged such that a pressure of the multiphase flow is measurable in the upper third, preferably near to the highest point, of a cross section of a horizontal or inclined pipe having the multiphase flow flowing through it.

34. Device as defined in claim 28, wherein a degree of similarity between the measured time development of the primary measured variable and one of the respective reference time developments of the primary measured variable is determinable by means of the processing unit.

35. Device as defined in claim 34, wherein by means of the processing unit a measured value of a characteristic quantity is determinable from:
the measured time development of the primary measured variable;
a reference value of a characteristic quantity from the reference time development of the primary measured variable; and
a distance between the measured value of the characteristic quantity and the reference value of the characteristic quantity is determinable.

36. Device as defined in claim 35, wherein a matching function is matchable to the measured time development and the reference time development, respectively, of the primary measured variable by means of the processing unit, wherein the parameters of the matching function correspond to the components of a vectorial characteristic quantity.

37. Device as defined in claim 28, wherein reference values of a plurality of target measured variables are adapted to be associated with each reference time development of the primary measured variable in the storage unit.

38. Device as defined in claim 28, wherein the multiphase flow is a two-phase flow.

39. Device for regulating a supply of fluid into a pipe having a multiphase flow flowing through it, in particular, into a horizontal or inclined steam generator pipe as a function of a target measured variable of the multiphase flow, comprising a device for determining a measure value of the target measured variable as defined in claim 28.

* * * * *